United States Patent [19]

Army, Jr. et al.

[11] Patent Number: 5,664,760
[45] Date of Patent: Sep. 9, 1997

[54] PRESSURE REGULATION VALVE WITH INTEGRATED DOWNSTREAM PRESSURE TAP

[75] Inventors: Donald E. Army, Jr., Springfield, Mass.; Brian G. Donnelly, Suffield; John P. Nikkanen, West Hartford, both of Conn.

[73] Assignee: United Technologies Corporation, Hartford, Conn.

[21] Appl. No.: 418,008

[22] Filed: Apr. 6, 1995

[51] Int. Cl.⁶ .............................. F16K 1/22; F16K 47/08
[52] U.S. Cl. ...................... 251/118; 251/305; 138/44
[58] Field of Search .......................... 251/118, 305; 137/625.3; 138/39, 44

[56] References Cited

U.S. PATENT DOCUMENTS

| | | |
|---|---|---|
| 1,637,967 | 8/1927 | Jacobson . |
| 2,929,248 | 3/1960 | Sprenkle . |
| 3,128,794 | 4/1964 | Boucher et al. . |
| 3,645,298 | 2/1972 | Roberts et al. . |
| 3,665,965 | 5/1972 | Baumann . |
| 3,951,171 | 4/1976 | Gibel . |
| 4,478,516 | 10/1984 | Kessler . |
| 4,527,771 | 7/1985 | Yeary ........................... 251/118 |
| 4,923,166 | 5/1990 | Raftis . |
| 5,070,909 | 12/1991 | Davenport . |
| 5,124,035 | 6/1992 | Dunne et al. . |
| 5,307,830 | 5/1994 | Welker . |
| 5,480,123 | 1/1996 | Bey ............................. 251/305 |
| 5,482,249 | 1/1996 | Schafbuch et al. ........... 251/118 |

FOREIGN PATENT DOCUMENTS 0101323  2/1984  European Pat. Off. .

*Primary Examiner*—Kevin Lee
*Attorney, Agent, or Firm*—Donald S. Holland, Esq.; Holland & Bonzagni, P.C.

[57] ABSTRACT

A baffle insert or sleeve is disclosed for the integration of the downstream pressure tap into a pressure regulation valve ("PRV") for an aircraft environmental control system ("ECS"). The purpose of this insert is to return the flow, disturbed by the pivoting disk of a butterfly valve, to a more normal distribution within the length of the valve body. This allows the PRV downstream pressure tap to be part of the valve, instead of it (along with additional plumbing) being located four more pipe diameters beyond the valve housing.

7 Claims, 2 Drawing Sheets

PRESSURE REGULATION VALVE WITH INTEGRATED DOWNSTREAM PRESSURE TAP

BACKGROUND OF THE INVENTION

This invention relates to a pressure regulation valve of the type useable in an aircraft environmental control system. More particularly, it relates to the valve used in the European Airbus.

Two pneumatic valves are typically linked, in a series, to control the flow in an environmental control system ("ECS"). The first is called a pressure regulation valve ("PRV") and it maintains a constant pressure downstream of the valve regardless of upstream conditions. The second is a control valve that modifies the system flow, using the discharge pressure of the PRV as a reference signal.

The present PRV is designed for use in an ECS, such as the cargo heating system for the European Airbus A320. That heating system is manufactured, as Model No. EC100, by Hamilton Standard, a division of United Technologies Corporation, the Assignee of this invention. Such an ECS may be used in conjunction with a gas-turbine engine, such as Model No. V2500, provided by Pratt & Whitney, also a division of United Technologies Corporation. That engine is implemented on the Airbus.

In the European Airbus, the PRV consists of a butterfly valve, actuator and controller. The valve has a main body through which the fluid flows and a disk that pivots to selectively choke or block the flow, thus controlling the pressure. A pressure tap downstream of the valve is used to sense the pressure. The controller uses this signal to maintain a constant pressure, downstream of the disk, regardless of changes in upstream flow or pressure.

Because of its blocking nature, the butterfly disk imparts a swirl to the flow that passes over it. That creates turbulence and cavitation. Textbooks on fluidics therefore suggest that the downstream pressure tap for control valve testing be located four to six pipe diameters downstream from the outlet connection of the butterfly valve being tested. This allows the flow to return to normal (i.e., become more laminar), sufficient to take an accurate reading of its static pressure.

This is fine in theory; but it creates design problems in an ECS for the Airbus, such as the aforementioned cargo heating system. To correctly monitor the downstream pressure from the PRV in that heating system, this guideline suggests that piping and an extra sensing line (routed back to the PRV) be located beyond the valve's main body. This extra plumbing complicates the valve's installation in the aircraft. For example, the sensing line must be clamped to aircraft structure to protect the line from vibration. It also increases the time required to remove and replace the valve and also adds extra weight. Where compactness and reduction in weight are critical goals in the Airbus (as in all flight systems), it would be beneficial if this extra hardware could be deleted there without sacrificing any appreciable accuracy in the pressure reading.

Accordingly, it is a principal object of the present invention to provide an improved pressure regulation valve, with an integrated downstream pressure tap, that overcomes the deficiencies of the prior art.

It is another general object to provide a unique baffle insert that enables an accurate pressure tap to be located within the valve body rather than downstream.

It is a specific object to provide an improved pressure regulation valve that eliminates plumbing a separate line four to six pipe diameters downstream.

It is another object to provide a baffle insert that fits into a standard channel of the cargo heating system for the Airbus A320.

SUMMARY OF THE INVENTION

A unique baffle insert is disclosed for the integration of a downstream pressure tap into the body of a standard pressure regulation valve. In the preferred embodiment, the invention comprises a baffle insert or sleeve that is designed to fit within the standard housing of a valve for a cargo heating system for the European Airbus A320. The insert has a flow baffle with multiple throughbores or channels, generally parallel to the flow path, that straighten the flow disturbed by the disk of a butterfly valve. Near the outlet of the valve is a ring of ports or pressure-tap holes in the insert, perpendicular to the flow path. These ports communicate sensed pressure, via a surrounding annular cavity, to a pressure sensing line that is integral to the valve body. Several of the channels in the flow baffle are canted outwardly to direct flow to the sense ports. A unique lip on the insert, just downstream from the ports, converts some dynamic pressure to static pressure at high flow rates for improved accuracy in pressure readings.

The above and other objects of this invention will become more readily apparent when the following detailed description is read in conjunction with the accompanying drawings.

DETAILED DESCRIPTION OF THE PREFERRED EMBODIMENT

Figure 1:
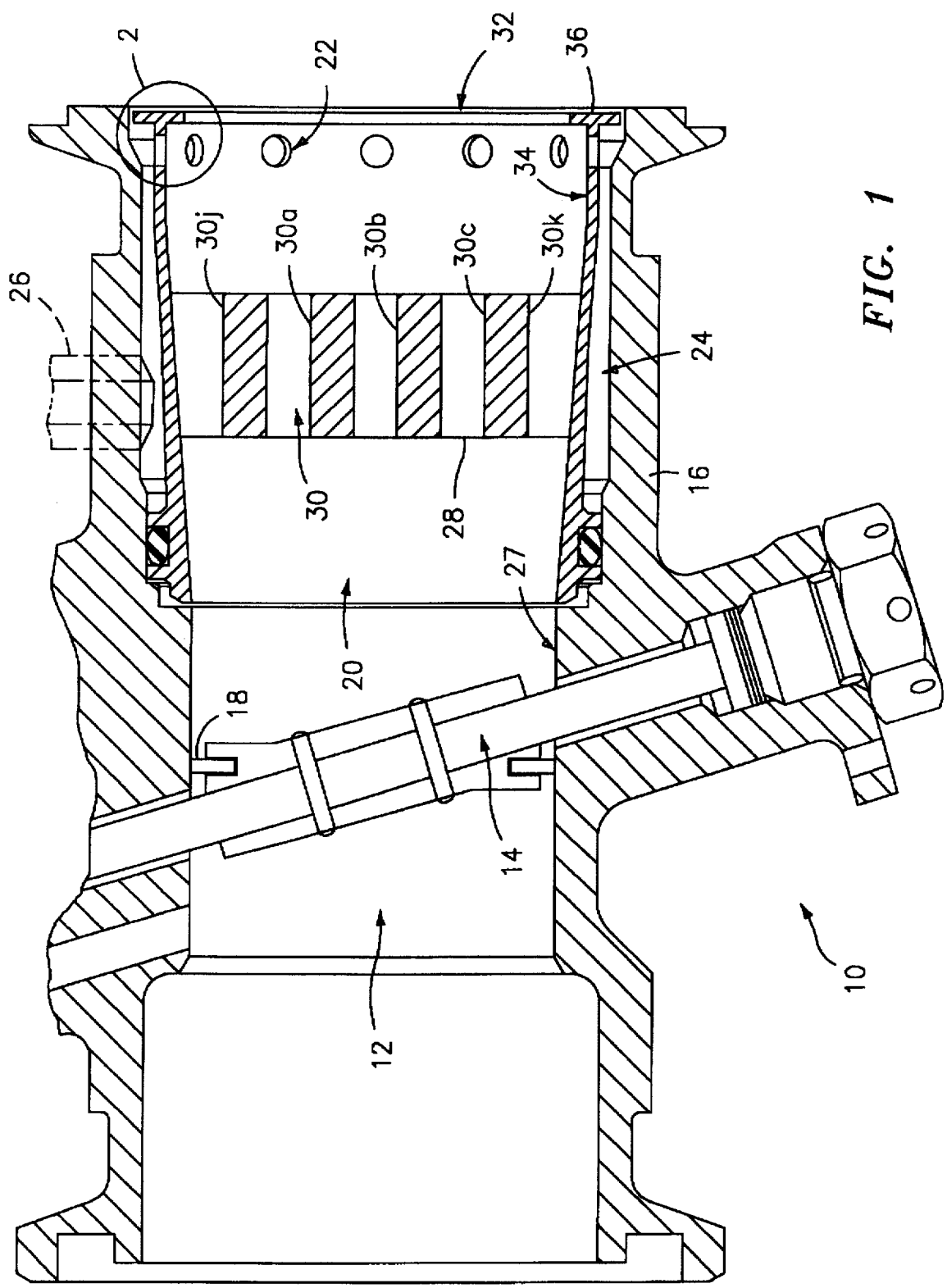
FIG. 1 shows a longitudinal cross section of a pressure regulation valve having a baffle insert and pressure tap, within the valve body, constructed in accordance with the present invention.
Figure 2:
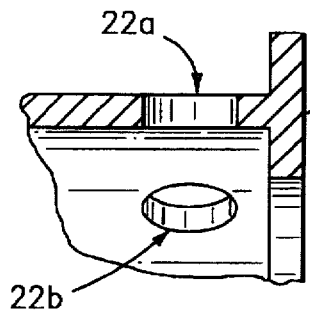
FIG. 2 is an enlarged view of an encircled portion (referenced by numeral 2) of FIG. 1, showing an annular lip and associated radial holes in the insert for taking static pressure readings.
Figure 3:
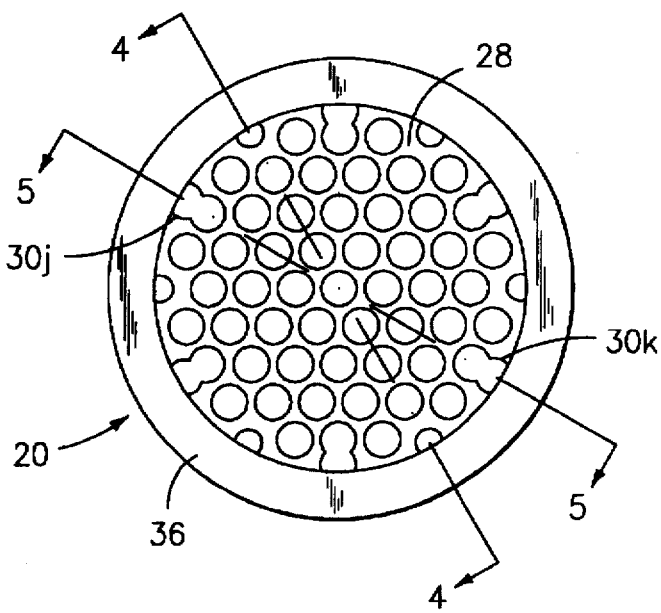
FIG. 3 is an end view of the insert, showing the lip and a flow baffle with channels.
Figure 4:
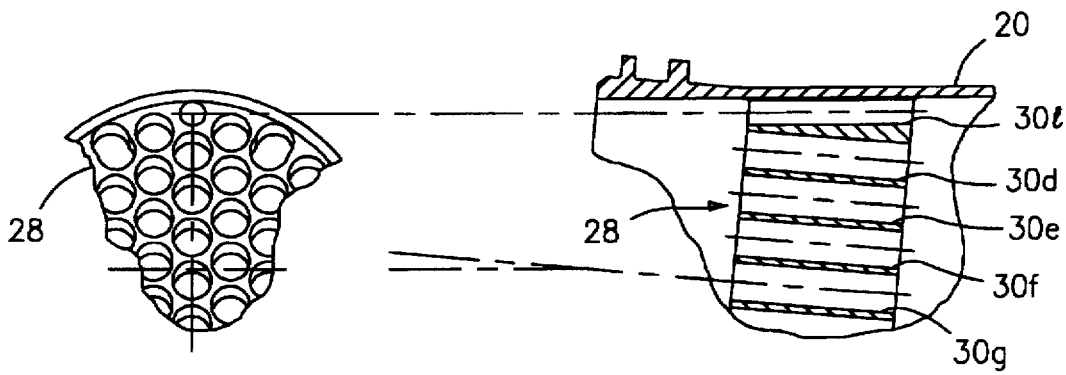
FIG. 4 contains a fragmentary cross-sectional view of the flow baffle, taken along line 4—4 of FIG. 3, showing a correlation with the discharge ports of depicted channels.

Referring to the drawings in detail, FIGS. 1–3 show an improved pressure regulation valve ("PRV") generally designated by the reference numeral 10. It is designed for use in the Assignee's cargo heating system, Model No. EC100, for the European Airbus A320.

Standard PRVs utilize a butterfly valve 12, actuator 14 and controller (not shown). The valve consists of a body 16 through which the flow passes and a pivotable disk 18 which controls the flow and thus the pressure. The actuator 14 provides the force to move the disk 18. The controller positions the actuator 14 and thus the disk 18 to maintain a downstream pressure which is determined by the design of the controller. A pressure tap downstream of the valve is typically used to sense the pressure. The controller uses the signal to maintain a constant pressure regardless of changes in flow or upstream pressure.

While the valve 12, actuator 14 and controller are important to the overall system of PRV 10, the unique aspects of this invention do not reside in them. The crux of the present invention centers around a unique baffle insert 20, with a pressure tap 22, and an associated annular cavity 24 inside the valve body 16 that enables an accurate pressure reading over a wide range of operating conditions.

The purpose of baffle 20 is to return the flow, disturbed by valve disk 18, to a more normal distribution (i.e., laminar flow) within the length of the valve body 16. This allows the PRV's downstream sense line 26 to be part of the valve.

Referring to FIG. 1, the baffle insert 20 is a generally frusto-conical sleeve made of any suitable material, such as aluminum. It is designed to slip into the standard size discharge channel 27 (depicted in FIG. 1) of the prior butterfly valves used in the cargo heating system.

The insert's outer shell diverges initially as the working fluid flows downstream from disk 18. Along the insert's mid-length is a generally cylindrical flow baffle or straightener 28. This flow baffle has multiple throughbores, or channels 30, generally parallel to the central axis of the valve's discharge channel 28. These multiple flow channels 30 segment the turbulent flow, caused by the fluid being processed upstream by disk 18, and "straighten it out" or make it laminar.

Figure 5:
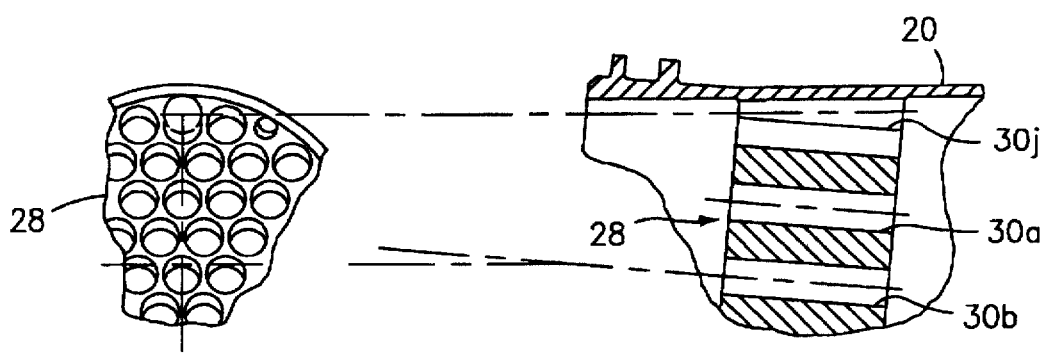
FIG. 5 contains a fragmentary cross-sectional view of the flow baffle, taken along line 5—5 of FIG. 3, showing a correlation with the discharge ports of depicted channels.

As best shown in FIGS. 1 and 3-5, the majority of the central throughbores (e.g., 30a, 30b, 30c in FIG. 1; 30d, 30e, 30f, 30g in FIG. 4; 30a, 30b in FIG. 5) have channel walls that are generally parallel to the intended overall direction of fluid flow, while several of the outer channels (e.g., 30j, 30k in FIG. 1; 30l in FIG. 4; 30j in FIG. 5) have tilted walls that direct the fluid passing through them toward the inside of the insert's shell, downstream of flow baffle 28. Note that FIG. 5 depicts some of the same flow channels (30a, 30b, 30j) shown in FIG. 1, since the cross-sectional views are taken along the same sight line, 5—5 of FIG. 3.

Near the outlet 32 of baffle insert 20 (starting at reference arrow 34), the inclined shell levels off. Pressure tap 22 is located in this leveled-off portion. It consists of a ring of twelve sense ports or pressure-tap holes (e.g., 22a, 22b) through the shell. These pressure-tap holes are equally spaced around the shell's circumference. Originally, Applicants experimented with just a ring of pressure-tap holes, but no baffle. In testing, Applicants found that these sense holes averaged the pressure at that location of the valve body so that a stable consistent signal was usually obtained. At high flow and high temperature, however, turbulence from the disk 18 was so severe that the pressure signal was unstable at some conditions.

The addition of a flow baffle (slightly different from that illustrated) straightened the flow. Again, at high flow and temperature, velocity was high so that static pressure was low and the valve regulated the downstream pressure too high.

An annular lip, shown at 36 in FIGS. 1-3, was added to the sleeve downstream of the ring 22 of pressure-tap holes. The lip 36 acts as a dam in the flow stream to slow down the flow over the pressure tap holes. This allows some of the dynamic velocity to be converted into static pressure. Thus the pressure signal is more like the signal at lower flows, thereby minimizing variation in pressure regulation. The height of lip 36 is sized to minimize additional pressure drop, but provide enough dynamic pressure recovery so that valve accuracy requirements are met.

Surrounding the sense ports is the annular cavity 24. It has been "carved out" from the standard housing of the prior PRV for the cargo heating system (not shown) to enable the pressure sensing line 26 to also be incorporated or integrated within the valve body 16. Fluid flows from the sense ports (e.g., 22a, 22b), after being dammed by the lip 36; through the cavity 24; and to pressure sense line 26 that communicates with a sensor that is part of the PRV's controller (not shown).

It is the combined effects of the flow baffle 28 to eliminate the swirl and turbulence, the lip 36 at the outlet 32 to increase static pressure at high flow, and the direction of flow to the lip 36 via canted bores (e.g., 30j, 30k, 30l) that enable the valve to meet the accuracy requirements.

It should be understood by those skilled in the art that obvious structural modifications can be made without departing from the spirit of the invention. Accordingly, reference should be made primarily to the accompanying claims, rather than the foregoing specification, to determine the scope of the invention.

Having thus described the invention, what is claimed is:

1. In a pressure regulation valve, for an aircraft environmental control system, of the type having a butterfly valve with a pivotable disk that controls fluid flow through a main body, a pressure tap downstream of the disk to sense fluid pressure, an actuator to move the disk, and a controller that positions the actuator and thus the disk, the improvement comprising:

a. a baffle insert sleeve which is adapted in size and shape to fit within a discharge channel of the butterfly valve, downstream from the disk, wherein the insert has an inlet end adjacent the disk and an outlet end adjacent an outlet of the discharge channel;

b. a flow baffle, within the insert, having a grid of throughbores for segmenting turbulent flow caused by the disk and making the turbulent flow more laminar within the valve body, wherein:
   i. a plurality of the throughbores are generally parallel to a central axis of the discharge channel;
   ii. a plurality of the throughbores are canted to direct the flow through them toward an inner wall of the baffle sleeve insert, downstream of the flow baffle;

c. a ring of pressure-tap holes in the insert, downstream of the flow baffle;

d. lip means for converting dynamic fluid pressure to static pressure at the pressure-tap holes, said lip means comprising an annular lip on the outlet end of the insert, adjacent the pressure-tap holes and downstream thereof, that acts as a dam to block the flow directed toward the inner wall of the baffle sleeve insert, by the canted throughbores in the flow baffle;

e. an annular cavity in the valve body, that surrounds the pressure-tap holes to communicate fluid pressure sensed by the holes to an adjacent pressure sensing line integrated within the valve body.

2. The pressure regulation valve of claim 1 wherein the inner wall of the baffle sleeve insert, initially diverges, starting adjacent the disk, and levels off before the pressure-tap holes.

3. The pressure regulation valve of claim 1 wherein the outlet end of the insert substantially coincides with the outlet of the discharge channel.

4. In a butterfly valve of the type having a main body through which fluid flows and a pivotable disk that selectively controls the flow and thus fluid pressure, the improvement comprising:

a. a baffle insert sleeve which is adapted in size and shape to fit within a discharge channel of the butterfly valve, downstream from the disk, wherein the insert has an inlet end adjacent the disk and an outlet end adjacent an outlet of the discharge channel;

b. a flow baffle, within the insert, having a grid of throughbores for segmenting turbulent flow caused by the disk and making the turbulent flow more laminar within the valve body, wherein:
   i. a plurality of the throughbores are generally parallel to a central axis of the discharge channel;
   ii. a plurality of the throughbores are canted to direct the flow through them toward an inner wall of the baffle sleeve insert, downstream of the flow baffle;
c. a ring of pressure-tap holes in the insert, downstream of the flow baffle;
d. lip means for converting dynamic fluid pressure to static pressure at the pressure-tap holes, said lip means comprising an annular lip on the outlet end of the insert, adjacent the pressure-tap holes and downstream thereof, that acts as a dam to block the flow directed toward the inner wall of the baffle sleeve insert by the canted throughbores in the flow baffle;
e. an annular cavity, in the valve body, that surrounds the pressure-tap holes to communicate fluid pressure sensed by the holes to an adjacent pressure sensing line integrated within the valve body.

5. The butterfly valve of claim 4 wherein the inner wall of the baffle sleeve insert initially diverges, starting adjacent the disk, and levels off before the pressure-tap holes.

6. The butterfly valve of claim 5 wherein the outlet end of the insert substantially coincides with the outlet of the discharge channel.

7. A baffle insert for segmenting turbulent flow within a valve body and returning the flow to a more laminar distribution, the insert comprising: a frusto-conical shell adapted in size and shape to fit within a discharge channel of the valve body; a flow baffle, within the shell, having a grid of throughbores, wherein a plurality of the throughbores are generally parallel to a central axis of the discharge channel and another plurality of the throughbores are canted to direct the flow through the cantel throughbores toward an inner wall of the shell, downstream of the flow baffle; a ring of pressure-tap holes in the insert, downstream of the flow baffle; and lip means for converting dynamic fluid pressure to static pressure at the pressure-tap holes, said lip means comprising an annular lip on an outlet end of the shell, adjacent the pressure-tap holes and downstream thereof, that acts as a dam to block the flow directed toward the inner wall of the shell by the canted throughbores in the flow baffle.

* * * * *

UNITED STATES PATENT AND TRADEMARK OFFICE
CERTIFICATE OF CORRECTION

PATENT NO. : 5,664,760
DATED : September 9, 1997
INVENTOR(S) : Donald E. Army, Jr., ET AL.

It is certified that error appears in the above-indentified patent and that said Letters Patent is hereby corrected as shown below:

In the Abstract, change "("PRY")" to --("PRV")--.

Column 1, line 12, change "("PRY")" to --("PRV")--.

In Claim 1, Column 4, line 25, change "a baffle insert sleeve" to --a baffle sleeve insert--.

In Claim 1, Column 4, line 46, remove the comma after the word "insert".

In Claim 1, Column 4, line 53, remove the comma after the word "insert".

In Claim 4, Column 4, line 63, change "a baffle insert sleeve" to --a baffle sleeve insert--.

Signed and Sealed this

Ninth Day of December, 1997

Attest:

Attesting Officer

BRUCE LEHMAN

Commissioner of Patents and Trademarks